United States Patent [19]

Fell

[11] 4,155,497
[45] May 22, 1979

[54] TAPE TRANSPORT MECHANISM FOR RECORDING/REPRODUCING APPARATUS, PARTICULARLY FOR VIDEO TAPE RECORDING USE

[75] Inventor: Wolfgang Fell, Seeheim, Fed. Rep. of Germany

[73] Assignee: Robert Bosch GmbH, Stuttgart, Fed. Rep. of Germany

[21] Appl. No.: 856,988

[22] Filed: Dec. 2, 1977

[30] Foreign Application Priority Data

Dec. 10, 1976 [DE] Fed. Rep. of Germany ....... 2656026

[51] Int. Cl.² .............................................. B65H 25/26
[52] U.S. Cl. ..................................... 226/21; 226/198; 226/199
[58] Field of Search ................. 226/21, 192, 196, 198, 226/199; 360/84, 85

[56] References Cited

U.S. PATENT DOCUMENTS

| | | | |
|---|---|---|---|
| 3,189,289 | 6/1965 | Maxey | 226/192 X |
| 3,507,437 | 4/1970 | Lips | 226/196 |
| 3,658,227 | 4/1972 | Stephens | 226/196 |
| 4,017,897 | 4/1977 | Blanding | 226/199 X |

*Primary Examiner*—Richard A. Schacher
*Attorney, Agent, or Firm*—Flynn & Frishauf

[57] ABSTRACT

To improve smoothness of tape transport in a spiral path over a guide cylinder, the guide rollers located immediately adjacent the guide cylinder, and journalled to rotate about an axis inclined with respect to the axis of the guide cylinder, can rotate about respective axes of rotation which are variable with respect to the axis of inclination defined by the bearing means journalling the guide rollers to permit self-balancing and self-adjustment of the spiral path of the tape about the cylinder during operation of the apparatus in dependence on the forces applied by the tape on the immediately adjacent rollers. Variation of the axis of rotation can be obtained by providing a central bearing for the roller about its axis of rotation, the bearing having a slight amount of play, and being offset with respect to the center of the tape passing around the roller to direct the edge of the tape against a guide surface and provide a fixed bias force on the bearing.

18 Claims, 7 Drawing Figures

TAPE TRANSPORT MECHANISM FOR RECORDING/REPRODUCING APPARATUS, PARTICULARLY FOR VIDEO TAPE RECORDING USE

The present invention relates to a magnetic tape transport mechanism, and more particularly to a tape transport mechanism for use in video tape recording apparatus in which a wide tape is passed, in a spiral path, over a cylinder in which a transducer head assembly is rotatably mounted so that the tape is scanned in inclined scanning paths.

BACKGROUND AND PRIOR ART

Video tape recording apparatus of various types is frequently subject to decrease in image quality which occurs due to irregularities of the band path over the recording/reproducing apparatus. It has been found that, frequently, the cause for irregular tape transport is the guide roller immediately in advance of the cylinder about which the tape is guided at an inclination. Other guide rollers may also be responsible for irregularities in transport, although to a lesser, or to a different degree. It is believed that the irregularities in tape transport are primarily due to deviations of the axes of the guide rollers from a desired, or command position. Such deviations, even of only a few seconds of arc, may have undesirable results on the eventual image quality. High and extremely arduous requirements are thus placed on the accuracy of manufacture, and adjustment of the guide rollers and the cylinder, thus substantially increasing manufacturing costs of the overall mechanism and apparatus.

Guide rollers which guide a tape in an inclined or spiral path over a cylinder must have their axes inclined with a definite, predetermined angle with respect to the axis of the cylinder about which the tape passes. Adjustment of the specific angle, within seconds of arc, is time-consuming and costly.

THE INVENTION

It is an object to so construct the tape apparatus, and particularly the guide roller assembly, or guide rollers therefor, that manufacture and adjustment are simplified, requiring only low precision in manufacture, while still providing excellent and improved image recording and reproduction quality, with respect to that obtainable by the prior art.

Briefly, a guide roller immediately adjacent the cylinder, and at least the guide roller forming the leading one with respect to the direction of operation of the tape, is rotatable about an axis of rotation which is variable with respect to the axis of inclination, as defined by its bearing secured to the frame of the machine, to permit self-balancing and self-adjustment of the spiral path of the tape about the cylinder during operation of the mechanism, in dependence on the forces applied by the tape on the immediately adjacent roller.

The precision of manufacture of the bearing, and of the bearing holder therefor, can be reduced so that, even if the bearing race is not at a precise angle of inclination with respect to the cylinder, excellent contact of the tape with the cylinder and, consequently, excellent quality of recording and reproduction of image signals can be obtained.

In accordance with a feature of the invention, a single bearing is secured to a bearing pin, and located slightly off-center with respect to the center of the tape passing over the guide roller so that an axial force is generated, the axial force keeping the tape against an edge guide and providing for precise positioning thereof on the guide roller, and hence on the cylinder.

Drawings, illustrating an example:

Figure 1:
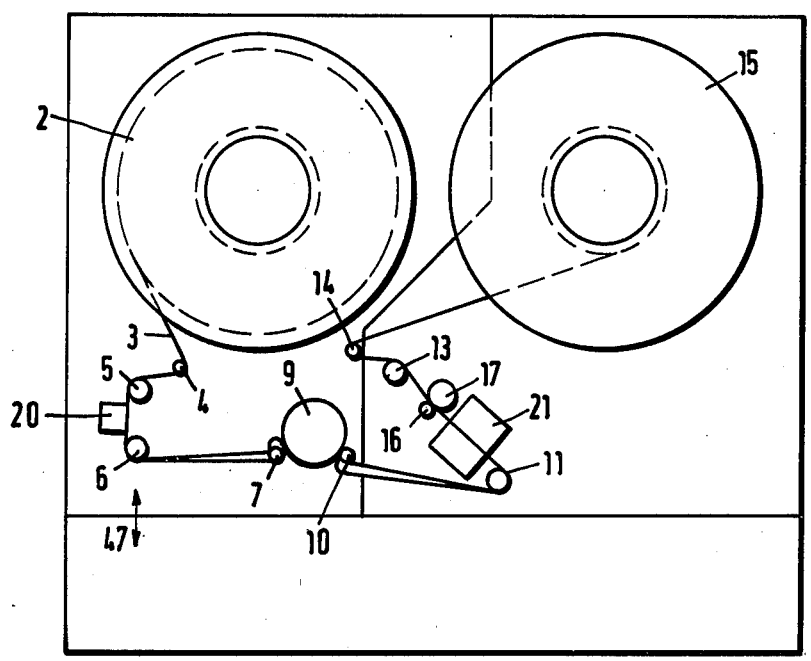
FIG. 1 is a highly schematic top view of the tape transport arrangement in a video tape recording/reproducing system.

A supply reel 2 (FIG. 1) provides a web of magnetic tape 3 to a take-up reel 15. The tape is guided over deflection and guide rollers 4, 5, 6, 7 over cylinder cylinder 9, which includes a scanning transducer, and over further deflection and guide rollers 10, 11, 13, 14 to the take-up reel 15. The tape is driven by a motor (not shown) which drives a capstan 16 engaging the tape 3 against a pressure roller or pressure pad 17. The tape 3 is guided past an erase head 20, and audio recording/reproducing heads 21. Tape 3 is looped in part around the cylinder 9 along a spiral line. A pair of transducers (not shown), rotating within cylinder 9 thus will scan the tape along an inclined path, with respect to the longitudinal direction of the tape. The axes of the guide rollers 7, 10 immediately adjacent cylinder 9 are inclined with respect to the axis of cylinder 9 so that the tape is guided in the aforementioned spiral path about a portion of the circumference of the cylinder 9. The inclination of the axes 7, 10 also pertains with respect to the remaining guide rollers. A suitable, and typical angle of inclination is about 14°.

The guide rollers 7, 10 are offset with respect to each other, in direction of the cylinder axis of the cylinder 9 in order to obtain the spiral path of the tape 3 thereover. The supply reel 2 as well as guide rollers 4, 5, 6 are axially offset with respect to the take-up reel 15 and the guide rollers 11, 13, 14 in the direction of the cylinder axis. The guide roller 7 is so formed that it can tilt with respect to the fixed axis passing therethrough when the apparatus is operating, the tilting being caused by the force, and effect of the tape being led from the supply reel 2, and deflected as it passes over the cylinder 9.

The guide roller 7 is journalled about a fixed axis or shaft 24 (FIG. 2), secured to a base or frame 23 of the tape transport mechanism. The shaft 24 carries the inner race 25 of a radial ball bearing 26. The ball bearing 26 is axially secured to the shaft 24 by two spacer sleeves 27, 27'. The outer race 29 of bearing 26 is secured to the cylinder 30 of the guide roller 7, and forms the contact surface of the guide roller with tape 3.

Magnetic tape 3 is guided about the roller 7 with a wrapping or looping angle of about 90°. It is taken off from the roller cover 30 in the direction of the arrow 32. The lower edge of the tape web 3 touches a guide flange 34 at the lower edge of the guide roller. Flange 34, preferably, is fixed and secured to the frame 23. The bearing 26 is so positioned by the sleeves 27, 27' that its center plane is above the center line 35 of the tape 3, as indicated by the dimension a. This slight off-center journalling of the roller sleeve 30, in combination with play in the bearing, permits slight tilting of the axis of rotation of the sleeve 30 with respect to the fixed inner race 25 of the bearing, and hence with respect to the fixed rotation axis, forming the axis of the pin or bolt 24. This tilt is in the direction of the arrow 37. Thus, small angular deviations of the tape, as supplied, are balanced since the portions of the guide roller 7 which are in contact with the tape can follow these deviations. The roller sleeve 30 will align itself in accordance with a balance of forces which is influenced by the tape, as supplied, as well as the tape as removed or paid out from roller 7. The roller will so adjust itself, under influence of the forces due to the tension in the tape supplied to the roller, and taken off from the roller, that any deformation of the tape itself becomes a minimum.

The plane of symmetry 36 of bearing 26 is placed above the center line 35 of the tape 3 in order to engage the edge of the tape 3 with slight friction against the bottom flange 34. This ensures correct lateral guidance of the tape. In accordance with the prior art, lateral guidance of the tape was obtained by resilient, for example spring-pressed guide flanges engaging the upper edge of the tape. This additional upper guide flange causes an undesirable friction of differing frictional force which, in turn, results in variations in the deformation forces acting on the tape. It is believed that these variations contributed to degradation of quality of recording and/or reproduction of signals on, or from the tape.

Figure 2:
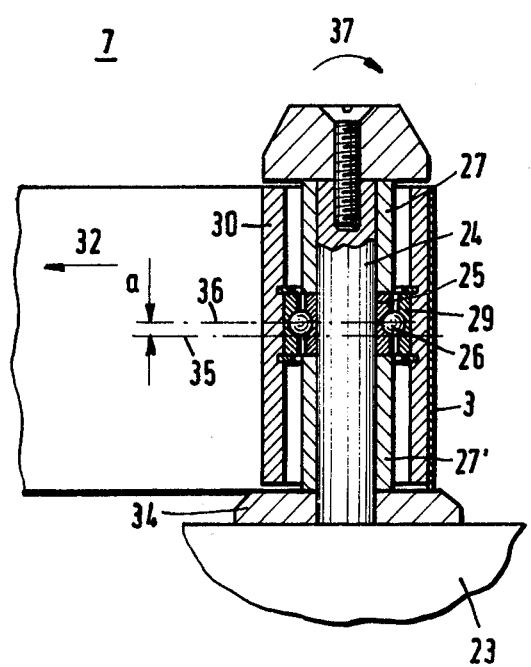
FIG. 2 is a sectional elevation view of a guide roller.
Figure 3:
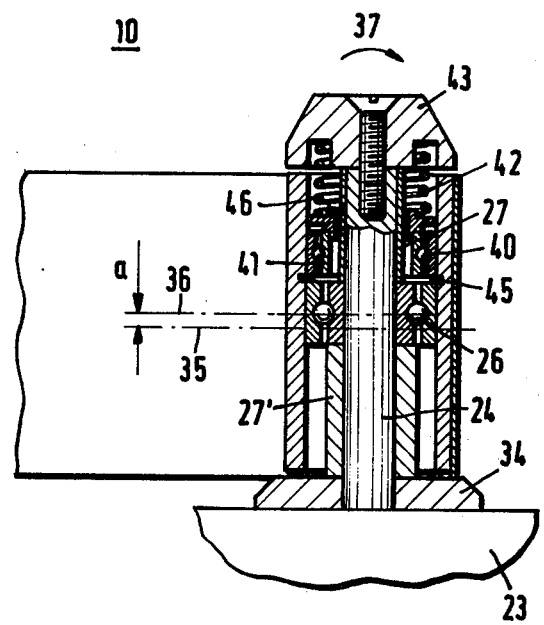
FIG. 3 is a sectional elevation of another embodiment of a guide roller.

Embodiment of FIG. 3: The basic structure is similar, and similar parts have been given the same reference numerals and will not be described again. The ball bearing 26 is located as in FIG. 2, with its central or plane of symmetry 36 slightly above the center line 35 of the tape 3. A second bearing 40 is provided, the interior race 41 of which surrounds the central shaft 24 with substantial clearance. The inner race 41 is axially biassed by a spring 42, the other end of which is supported by an end cap 43, secured to the fixed shaft 24 of the roller. A ring 45 is located between the outer races of the bearings 26 and 40, respectively, so that the axial force due to spring 42 is transferred from the outer race of bearing 40 and over ring 45 to the outer race of bearing 26. Thus, the two bearings 26, 40 are biassed with respect to each other. Preferably, spring 42 is comparatively long so that it is capable of accepting axial forces but is practically insensitive to radial forces, to prevent interference with tilting of the outer sleeve of the roller. This construction is suitable, for example, for the roller 10. A holding element 46 is located between the spring 42 and the inner race of ball bearing 40 to provide a positive seating and engagement surface, and forming a spacer element.

The arrangement of FIG. 3 has the advantage that rapid re-spooling of the tape reliably prevents possible uncontrolled oscillation, and flutter of the tape.

The guide rollers 7, 10 are preferably journalled as explained in connection with FIGS. 2 and 3. It has been found desirable to also provide for self-alignment of other rollers, and specifically of the roller 6 which is located, in the direction of tape spooling, immediately in advance of the guide roller 7. Roller 6 should, preferably, be so constructed that the tilting movement of the roller is possible only in a single plane, however, but not in a plane at right angles with respect thereto.

Figure 4:
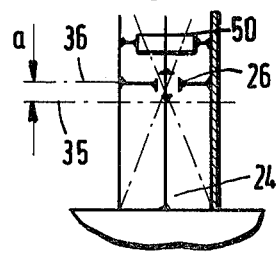
FIG. 4 is a schematic illustration of a guide roller, and illustrating forces arising therein.
Figure 4A:
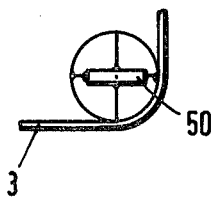
FIG. 4a is a top view of the arrangement of FIG. 4.
Figure 5:
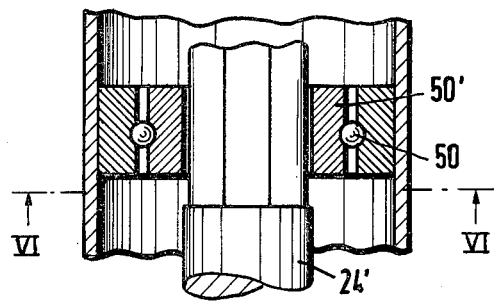
FIG. 5 is a fragmentary vertical elevation of a constructional detail showing the upper bearing of the structure of FIG. 4.
Figure 6:
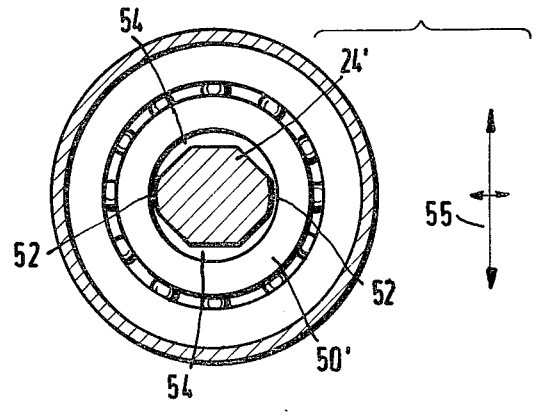
FIG. 6 is a cross section along line VI—VI of FIG. 5.

Embodiment of FIG. 4, for roller 6: The center line 35 of the tape 3 is located below the plane of symmetry of the radial bearing 26. The restriction of tilting movement is obtained by a second, upper bearing 50, located above bearing 26, and so arranged that its inner race is longitudinally slidable in a direction transverse to the axis of the holding bolt or pin 24. The schematic arrangement is clearly shown in FIGS. 4 and 4a. The actual construction of bearing 50 is best seen when considering FIGS. 5 and 6: Shaft 24' is deformed in the region of the inner race of the bearing 50, to have the shape as shown in FIG. 6, which may be termed an elliptical hexagon. The inner race 50' has little play with respect to the shaft end in the region 52, but much more play with respect to the regions 54, offset 90° with respect to the regions 52. Thus, the inner race 50 can tilt in the direction of the arrow 55, that is, to carry out a relatively large deflection up and down (as seen in FIG. 6), but only slight deflection right and left.

The shaft 24' is so positioned with respect to the direction of the tape being supplied to the roller 6 that the forces exerted on the roller 6 by the tape 3 permit tilting only in the plane of the tape being supplied to the roller 6, but not in the direction of the tape 3 as it is taken off the roller 6, the deflection by roller 6 being by about 90°. The additional rollers 4, 5 may also be constructed in accordance with the principles of the present invention as explained in connection with FIGS. 2, 3, as well as with in connection with FIGS. 4–6. Preferably, the third deflection roller 5—counting from the cylinder 9—is so journalled that, in operation, and under effect of the force of the supply portion of the tape and the then deflected take-off portion of the tape, the axis of the cylindrical portion engaged by the tape can tilt with respect to the fixed axis, or holding element for the cylindrical portion engaged by the tape. Thus, roller 5 for example may be constructed as explained in connection with FIG. 2 or 3, particularly if the looping angle thereover is substantially different from 90°.

The axial offset a (FIGS. 2, 3, 4) should be not less than about 1 mm, preferably about 2 mm, for a tape having a width of 25.4 mm.

The maximum tilt of the axes of the surface engaged by the tape on the rollers 5, 6, 7 with respect to the fixed, set axes of the respective rollers, defined, for example by the axes of pins or bolts 24, 24', should, preferably not exceed 5°. In a preferred form, the tilt of the axis of the surface engaged by the tape of rollers 7, 10, immediately adjacent the tape, is about 1° and that of roller 6, further remote from the cylinder 9, is about 1°.

Various changes and modifications may be made, and features described in connection with any one of the embodiments may be used with any of the others, within the scope of the inventive concept.

I claim:

1. In a tape recording/reproducing apparatus, particularly for video tape recording, a tape transport mechanism having a cylinder (9) about which the tape is spirally passed;
at least one leading tape guide roller means (4, 5, 6, 7);
at least one trailing tape guide roller means (10, 11, 13, 14),
said roller means guiding the tape between a supply reel (2) to a take-up reel (15);
the roller means (7, 10) immediately adjacent said cylinder having a fixed central axis or shaft (24), bearing means (23, 24, 26) rotatable about said shaft, and a roller sleeve (30) engaged by the tape (3)

having rotation axes inclined with respect to the axis of said cylinder (9) to guide running tape (3) around the cylinder in a spiral path;

at least one of said roller means (7) and located immediately adjacent said cylinder (9) being rotatable about an axis of rotation which is variable with respect to said inclined axis of rotation defined by said bearing means to permit self-balancing and self-adjustment of the spiral path of the tape (3) about the cylinder (9) during operation of the mechanism in dependence on the forces applied by said tape on said immediately adjacent roller means (7); the central plane of symmetry (36) of said bearing means, and extending essentially transversely to said central axis (24) being offset axially with respect to the center line (35) of said tape;

and a guide flange (34) located adjacent one axial end of the roller sleeve (30) for engagement by the tape and having a diameter large with respect to said roller sleeve to guide the edge of the tape, the guide sleeve being located at the end of the guide sleeve which is opposite from the center line of the tape with respect to the plane of symmetry (36) of the bearing;

the axial offset of the plane of symmetry of the bearing means providing, upon running of said tape over said sleeve, a vectorial force vector tending to move the tape laterally in guiding engagement with said flange (34).

2. Mechanism according to claim 1, wherein the leading roller means (7), with respect to the direction of operation of the tape (3) is rotatable about said variable axis of rotation.

3. Mechanism according to claim 1, wherein the leading roller means (7) as well as the trailing roller means (10), with respect to the direction of operation of the tape, and immediately adjacent said cylinder, are rotatable about said variable axis of rotation.

4. Mechanism according to claim 1, wherein said mechanism includes at least one additional deflection roller (6) located in advance—with respect to the direction of operation of the tape—of the leading roller means (7) immediately adjacent said cylinder (9) which has a roller deflection surface rotatable about an axis of rotation which can tilt with respect to the axis of said deflection roller (6) as a function of the forces applied by the tape as it is looped about the roller deflection surface.

5. Mechanism according to claim 4, wherein the tilt axis of said roller deflection surface can tilt essentially only in the plane of the tape at the supply side of the deflection roller.

6. Mechanism according to claim 1, wherein said mechanism includes a second additional deflection roller (5) located in advance of said one additional deflection roller (6), said second additional deflection roller having a second deflection surface rotatable about an axis of rotation which can tilt with respect to the axis of said second additional deflection roller.

7. Mechanism according to claim 1, wherein the offset distance (a) between the center line of the tape and the plane of symmetry is at least 1 mm.

8. Mechanism according to claim 1, for use with 25.4 mm. tape, wherein the offset distance (a) between the center line (35) of the tape (3) and the plane symmetry (36) of the bearing (26) is about 2 mm.

9. Mechanism according to claim 1, wherein the guide flange (34) is fixed.

10. Mechanism according to claim 1 wherein said bearing means (23, 24, 26) of the roller means immediately adjacent said cylinder comprises a radial ball bearing, secured to said sleeve and rotatable about said shaft.

11. Mechanism according to claim 10, wherein the offset distance (a) between the center line of the tape and the plane of symmetry is at least 1 mm.

12. Mechanism according to claim 10, further including a second radial ball bearing (40) internally engaging said roller sleeve (30) and having an inner race spaced from the central axis or shaft (24);

resilient bias means (42) engaging the center race of said second ball bearing (40);

and force transfer means (45) located between the outer races of said ball bearings (26, 40) transferring the axial force of said resilient bias means and eliminating axial play of said ball bearings (26, 40), while permitting radial tilt of the first ball bearing (26) with respect to said fixed central axis or shaft (24).

13. Mechanism according to claim 10, further including a second ball bearing (50) located within said roller sleeve;

the second ball bearing being slidable in a predetermined plane passing through the axis of said central axis or shaft (24) but having essentially little or no play in a plane transversely with respect to said first plane.

14. Mechanism according to claim 1, further including means (27, 27') locating said bearing means in fixed axial position on said central axis or shaft.

15. Mechanism according to claim 1, wherein said bearing has play, the play of said bearing providing for said variation of the axis of the roller sleeve with respect to the fixed central axis of the shaft and permitting tilt of the axis of the roller sleeve engaged by the tape.

16. Mechanism according to claim 15, wherein the roller means having the bearing with said play is the roller means (7) immediately adjacent said cylinder (9), and the permitted tilt is about 1°.

17. Mechanism according to claim 15, wherein the roller means (6) having the bearing with said play is the roller means (6) immediately adjacent the roller means having said inclined axis (7), and the permitted tilt is about 1°.

18. Mechanism according to claim 15, wherein the offset distance (a) between the center line of the tape and the plane of symmetry is at least 1 mm.

* * * * *